United States Patent
Yamashita et al.

(10) Patent No.: US 12,258,478 B2
(45) Date of Patent: *Mar. 25, 2025

(54) GARDENIA BLUE PIGMENT AND METHOD FOR PRODUCING THE SAME

(71) Applicant: GLICO NUTRITION CO., LTD., Osaka (JP)

(72) Inventors: Junya Yamashita, Osaka (JP); Masahiro Nishikawa, Osaka (JP); Kaori Miura, Osaka (JP); Kenichi Fujimori, Osaka (JP)

(73) Assignee: GLICO NUTRITION CO., LTD., Osaka (JP)

( * ) Notice: Subject to any disclaimer, the term of this patent is extended or adjusted under 35 U.S.C. 154(b) by 525 days.

This patent is subject to a terminal disclaimer.

(21) Appl. No.: 17/603,621

(22) PCT Filed: Apr. 6, 2020

(86) PCT No.: PCT/JP2020/015494
§ 371 (c)(1),
(2) Date: Oct. 14, 2021

(87) PCT Pub. No.: WO2020/213448
PCT Pub. Date: Oct. 22, 2020

(65) Prior Publication Data
US 2022/0195197 A1    Jun. 23, 2022

(30) Foreign Application Priority Data
Apr. 16, 2019 (JP) .................................. 2019-078126

(51) Int. Cl.
C09B 61/00 (2006.01)
A23L 5/43 (2016.01)
C09B 67/00 (2006.01)

(52) U.S. Cl.
CPC ............. *C09B 61/00* (2013.01); *A23L 5/43* (2016.08); *C09B 67/0001* (2013.01)

(58) Field of Classification Search
CPC ........ C09B 61/00; C09B 67/0001; A23L 5/43
See application file for complete search history.

(56) References Cited

U.S. PATENT DOCUMENTS

2018/0258286 A1    9/2018    Kasai

FOREIGN PATENT DOCUMENTS

| EP | 3357977 A1 | 8/2018 |
|---|---|---|
| JP | 5253934 A | 4/1977 |
| JP | 56092792 A | 7/1981 |
| JP | 1179690 A | 7/1989 |
| JP | 07111896 A | 5/1995 |
| JP | 2015091946 A | 5/2015 |
| JP | 2017063650 A | 4/2017 |
| WO | 03029358 A1 | 4/2003 |
| WO | 2006082922 A1 | 8/2006 |
| WO | 2016045100 A1 | 3/2016 |
| WO | 2017057187 A1 | 4/2017 |
| WO | 2017156744 A1 | 9/2017 |
| WO | 2018029338 A1 | 2/2018 |

OTHER PUBLICATIONS

Extended European Search Report for corresponding European Application No. EP 20792053.9 dated Jan. 4, 2023.
English Translation of ISR of corresponding Application No. PCT/JP2020/015494 mailed Jul. 7, 2020.
Xu, You-zhi, et al., "Study on Preparation and Stability of High Color Value Gardenia Blue", Modern Food Science and Technology, 2011, vol. 27, No. 4, pp. 440-443, Table 1.

*Primary Examiner* — Katherine D Leblanc
(74) *Attorney, Agent, or Firm* — Renner, Otto, Boisselle & Sklar, LLP

(57) ABSTRACT

An object of the present invention is to provide a gardenia blue pigment that can stably maintain the color tone even after heating under acidic conditions, and a method for producing the gardenia blue pigment. A gardenia blue pigment that can stably maintain the color tone even after heating under acidic conditions is obtained by carrying out the following first and second steps: the first step of reacting walnut peptide, bitter melon peptide, and/or soy peptide with genipin in a solvent without the supply of a gas containing oxygen; and the second step of treating the reaction solution obtained in the first step with the supply of a gas containing oxygen.

3 Claims, No Drawings

GARDENIA BLUE PIGMENT AND METHOD FOR PRODUCING THE SAME

This application is a national phase of International Application No. PCT/JP2020/015494 filed 6 Apr. 2020, which claims priority to Japan Application No. 2019-078126 filed 16 Apr. 2019, the entireties of which are hereby incorporated by reference.

TECHNICAL FIELD

The present invention relates to a gardenia blue pigment that can stably maintain the color tone even after heating under acidic conditions. The present invention also relates to a method for producing the gardenia blue pigment.

BACKGROUND ART

Conventionally, gardenia blue pigment, which is a natural pigment, has been widely used as a blue colorant for use in food products and the like. Gardenia blue pigment is produced by the action of a β-glucosidase and a primary amino group-containing compound on an iridoid glycoside obtained from the fruit of *Gardenia jasminoides* Ellis of Rubiaceae under aerobic conditions. However, gardenia blue pigment obtained by this process has the drawback that when heated under acidic conditions, it becomes reddish, and changes in color tone. Therefore, when such conventional gardenia blue pigment is used for acidic food or beverage products, even if it has a desired color tone before heat sterilization, it turns into a strong reddish tone after heat sterilization, and thus, is used in only a limited range of uses.

Thus, various studies have heretofore been made on techniques that can improve the stability of gardenia blue pigment under acidic conditions.

For example, Patent Literature 1 discloses subjecting an iridoid glycoside to a β-glucosidase treatment in the presence of a silk-derived protein hydrolysate, thereby obtaining a gardenia blue pigment that can maintain a state in which it is stably dissolved in an acidic region. However, the gardenia blue pigment described in Patent Literature 1 has a problem in that it has a strong reddish tone, and, after heated under acidic conditions, it shows a considerable change in color tone due to increased redness.

Patent Literature 2 discloses adding gum ghatti and/or gum arabic to gardenia blue pigment, thereby imparting acid resistance. However, in the gardenia blue pigment described in Patent Literature 2, a change in color tone after heating under acidic conditions cannot be prevented.

CITATION LIST

Patent Literatures

Patent Literature 1: JP 2017-63650 A
Patent Literature 2: JP 2015-91946 A

SUMMARY OF INVENTION

Technical Problem

It is an object of the present invention to provide a gardenia blue pigment that can stably maintain the color tone even after heating under acidic conditions, and a method for producing the gardenia blue pigment.

Solution to Problem

As a result of extensive research to solve the aforementioned problem, the present inventors have found that a gardenia blue pigment that can stably maintain the color tone even after heating under acidic conditions is obtained by carrying out the first step of reacting walnut peptide, bitter melon peptide, and/or soy peptide with genipin in a solvent without the supply of a gas containing oxygen; and the second step of treating the reaction solution obtained in the first step with the supply of a gas containing oxygen.

The inventors have also found that when the gardenia blue pigment obtained by carrying out the first and second steps is subjected to operations as set forth in (1) to (3) below, a color difference $\Delta E^*_{ab}$ between solution A heat-treated at 90° C. for 15 minutes and solution B not heat-treated is 3.5 or less, and solution A heat-treated at 90° C. for 15 minutes has an L* value of 64 or more, an a* value of −14 or less, and a b* value of −31 or more:

<Operation Conditions>
(1) Preparation
    the gardenia blue pigment is diluted with 0.1 M citrate buffer at pH 2.5 to prepare solution A with a color value $E^{10\%}_{1\ cm}$ of 0.1; separately, the gardenia blue pigment is diluted with 0.1 M citrate buffer at pH 6.0 to prepare solution B with a color value $E^{10\%}_{1\ cm}$ of 0.1;
(2) Heat-Treatment of the Solutions
    solution A is heat-treated at 90° C. for 15 minutes; solution B is not heat-treated;
(3) Measurement of Color Tone
    for solution A heat-treated at 90° C. for 15 minutes and solution B not heat-treated, the L* value, the a* value, and the b* value in the Lab color space are measured.

The present invention has been completed by conducting further research based on these findings. In summary, the present invention provides the aspects of the invention as set forth below:

Item 1. A gardenia blue pigment in which, when the gardenia blue pigment is subjected to operations as set forth in (1) to (3) below, a color difference $\Delta E^*_{ab}$ between solution A heat-treated at 90° C. for 15 minutes and solution B not heat-treated is 3.5 or less, and solution A heat-treated at 90° C. for 15 minutes has an L* value of 64 or more, an a* value of −14 or less, and a b* value of −31 or more:

<Operation Conditions>
(1) Preparation
    the gardenia blue pigment is diluted with 0.1 M citrate buffer at pH 2.5 to prepare solution A with a color value $E^{10\%}_{1\ cm}$ of 0.1; separately, the gardenia blue pigment is diluted with 0.1 M citrate buffer at pH 6.0 to prepare solution B with a color value $E^{10\%}_{1\ cm}$ of 0.1;
(2) Heat-Treatment of the Solutions
    solution A is heat-treated at 90° C. for 15 minutes; solution B is not heat-treated;
(3) Measurement of Color Tone
    for solution A heat-treated at 90° C. for 15 minutes and solution B not heat-treated, the L* value, the a* value, and the b* value in the Lab color space are measured.

Item 2. A food or beverage product colored with the gardenia blue pigment according to item 1.

Item 3. The food or beverage product according to item 2, which is an acidic food or beverage product.

Item 4. A method for producing a gardenia blue pigment, comprising the following first and second steps:
    first step: reacting at least one selected from the group consisting of walnut peptide, bitter melon peptide, and soy peptide with genipin in a solvent without the supply of a gas containing oxygen; and
    second step: treating the reaction solution obtained in the first step with the supply of a gas containing oxygen.

Item 5. The method according to item 4, wherein air is used as the gas containing oxygen.

Advantageous Effects of Invention

According to the present invention, a gardenia blue pigment that can stably maintain the color tone even after heating under acidic conditions can be produced using a simple method. Moreover, the gardenia blue pigment of the present invention is a natural pigment, and thus, can color acidic food products in a good color tone, with high safety.

DESCRIPTION OF EMBODIMENTS

1. Gardenia Blue Pigment

A gardenia blue pigment of the present invention has a feature in that when it is subjected to operations as set forth in (1) to (3) below, a color difference $\Delta E^*_{ab}$ between solution A heat-treated at 90° C. for 15 minutes and solution B not heat-treated is 3.5 or less, and solution A heat-treated at 90° C. for 15 minutes has an L* value of 64 or more, an a* value of −14 or less, and a b* value of −31 or more. Hereinafter, the gardenia blue pigment of the present invention will be described in detail.

The property of stably maintaining the color tone even after heating under acidic conditions may be referred to herein as "acidic heating resistance".

[Acidic Heating Resistance]

The gardenia blue pigment of the present invention has excellent acidic heating resistance; specifically, the gardenia blue pigment of the present invention has a property such that when it is subjected to operations as set forth below, a color difference $\Delta E^*_{ab}$ between solution A heat-treated at 90° C. for 15 minutes and solution B not heat-treated is 3.5 or less, and solution A heat-treated at 90° C. for 15 minutes has an L* value of 64 or more, an a* value of −14 or less, and a b* value of −31 or more:

<Operation Conditions>

(1) Preparation the gardenia blue pigment is diluted with 0.1 M citrate buffer at pH 2.5 to prepare solution A with a color value $E^{10\%}_{1\ cm}$ of 0.1; separately, the gardenia blue pigment is diluted with 0.1 M citrate buffer at pH 6.0 to prepare solution B with a color value $E^{10\%}_{1\ cm}$ of 0.1;

(2) Heat-Treatment of the Solutions solution A is heat-treated at 90° C. for 15 minutes; solution B is not heat-treated;

(3) Measurement of Color Tone for solution A heat-treated at 90° C. for 15 minutes and solution B not heat-treated, the L* value, the a* value, and the b* value in the Lab color space are measured.

As used herein, "color value $E^{10\%}_{1\ cm}$" is the unit for expressing the color intensity of the pigment, and refers to the value obtained by measuring the absorbance at the maximum absorption wavelength in a reliable range of concentrations using an absorbance meter with a cell having an optical path length of 1 cm, and converting the absorbance to the value for a 10% by weight solution. As used herein, "$E^{10\%}_{1\ cm}$ of 0.1" means that when the value of color value $E^{10\%}_{1\ cm}$ is rounded off to three decimal places, it is 0.100.

Since the maximum absorption wavelength of gardenia blue pigment is around 600 nm, the color value $E^{10\%}_{1\ cm}$ of the gardenia blue pigment can be determined by measuring the absorbance at a maximum absorption wavelength specified around 600 nm. If there is no maximum absorption wavelength, the absorbance at 600 nm can be measured.

While the color difference $\Delta E^*_{ab}$, between solution A heat-treated at 90° C. for 15 minutes and non-heat treated solution B may be 3.5 or less, it is preferably 3.0 or less, more preferably 0 to 2.5, and even more preferably 0 to 2.0, from the viewpoint of imparting higher acidic heating resistance.

While the L* value of solution A heat-treated at 90° C. for 15 minutes may be 64 or more, it is preferably 65 or more, more preferably 65 to 70, and even more preferably 66 to 70, from the viewpoint of imparting higher acidic heating resistance.

While the a* value of solution A heat-treated at 90° C. for 15 minutes may be −14 or less, it is preferably −15 or less, more preferably −26 to −16, and even more preferably −26 to −17, from the viewpoint of imparting higher acidic heating resistance.

While the b* value of solution A heat-treated at 90° C. for 15 minutes may be −31 or more, it is preferably −30 or more, more preferably −29 to −22, and even more preferably −28 to −22, from the viewpoint of imparting higher acidic heating resistance.

As used herein, the values in the Lab color space are the values measured using a spectrophotometer (CM-5; KONICA MINOLTA JAPAN, INC.). The measurement conditions are as follows: total transmission measurement, a D65 light source, a field-of-view of 10°, a measurement diameter of 20 mm, and an irradiation diameter of 26 mm.

The gardenia blue pigment of the present invention that satisfies these characteristics can be obtained using the method described below.

[Use]

The gardenia blue pigment of the present invention is used as a blue colorant. While the products for which the gardenia blue pigment of the present invention is used are not limited as long as they require the use of a blue colorant, specific examples include food or beverage products, cosmetics, preparations for oral cavity, and pharmaceuticals. The gardenia blue pigment of the present invention, which is naturally derived and has high safety, is particularly suitable as a colorant for food or beverage products.

The food or beverage products to be colored with the gardenia blue pigment of the present invention are not limited in type, as long as they are required to be colored blue. Examples include confectioneries, such as jellies, gums, gummies, agar, cakes, cookies, and tablet candy; Japanese confectioneries, such as dumplings, rice cake sweets, bracken-starch dumplings (warabimochi), and bean pastes; processed fruit products, such as fruit sauces; jams, such as strawberry jam and blueberry jam; syrup; seasonings, such as Japanese sweetened sake (mirin), cooking liquor, dressings/dipping sauces, and sauces; frozen desserts, such as ice creams, iced milk, and ice desserts; dairy products, such as yogurt, ice creams, and whipped cream; seafood paste products, such as boiled fish pastes, fish cake tubes, fish meat sausages, and fish meat pastes; bottled and canned products, such as meat, fish meat, and fruits; beverages, such as lactic acid bacteria beverages, soft drinks, carbonated beverages, fruit juices, non-fruit beverages, fruit beverages, vegetable beverages, sport drinks, powdered beverages, jelly drinks, and alcoholic beverages; pickles; and noodles.

When the gardenia blue pigment of the present invention has acidic heating resistance, it is suitable for use in acidic food or beverage products, particularly acidic food or beverage products that are heat-sterilized in the manufacturing process. As used herein, the acidic food or beverage products refers to food or beverage products with a pH of 5.0 or less.

The pH of the acidic food or beverage products to be colored with the gardenia blue pigment is not limited as long as it is in the range of 5.0 or less. For example, the gardenia blue pigment of the present invention can impart a stably maintained color tone to acidic food or beverage products with a pH of 4.0 or less. Specific examples of acidic food or beverage products include acidic beverages, such as lactic acid bacteria beverages, soft drinks, carbonated beverages, fruit juices, non-fruit beverages, fruit beverages, vegetable beverages, sport drinks, jelly drinks, and alcoholic beverages; dairy products, such as yogurt, ice creams, and whipped cream; desserts, such as jellies; frozen desserts, such as sorbets, iced milk, and ice desserts; confectioneries, such as gummies and jelly beans; jams, such as strawberry jam and blueberry jam; sauces, such as fruit-flavored sauces; pickles; and seasonings, such as dressings.

The cosmetics to be colored with the gardenia blue pigment of the present invention are not limited in type, as long as they are required to be colored blue. Examples include basic skin care products, such as creams, emulsions, toners, essences, ointments, oils, packs, lotions, and gels; and makeup cosmetics, such as foundations, eyeshadows, lipsticks, and blushes.

The preparations for oral cavity to be colored with the gardenia blue pigment of the present invention are not limited in type, as long as they are required to be colored blue. Examples include dentifrices, such as paste, powder, and liquid dentifrices; tooth creams; mouth rinses, such as mouthwashes and gargles; pastes for oral cavity, mouth sprays, oral disintegrating films, gels, troches, tablets, and chewable tablets.

The pharmaceuticals to be colored with the gardenia blue pigment of the present invention are not limited in type, as long as they are required to be colored blue. Examples include powders, granules, tablets, capsules, pills, and liquids.

The amount of the gardenia blue pigment of the present invention to be added to the product to be colored may be set appropriately according to the type of the product and the degree of coloring to be applied to the product.

2. Method for Producing Gardenia Blue Pigment

A method for producing a gardenia blue pigment of the present invention has a feature in that it comprises the first and second steps as set forth below. The method for producing a gardenia blue pigment of the present invention will be hereinafter described in detail.

First step: reacting at least one selected from the group consisting of walnut peptide, bitter melon peptide, and soy peptide with genipin in a solvent without the supply of a gas containing oxygen.

Second step: treating the reaction solution obtained in the first step with the supply of a gas containing oxygen.

[First Step]

Walnut Peptide, Bitter Melon Peptide, and/or Soy Peptide

In the first step, at least one selected from the group consisting of walnut peptide, bitter melon peptide, and soy peptide is used as a primary amino group-containing compound.

Walnut peptide is a peptide with a low molecular weight obtained by hydrolysis of a walnut-derived protein. The hydrolysis of the walnut-derived protein may be carried out using any known method without limitation, for example, protease treatment, acid treatment, or alkali treatment. The walnut peptide may also be a commercial product.

Bitter melon peptide is a peptide with a low molecular weight obtained by hydrolysis of a bitter melon-derived protein. The hydrolysis of the bitter melon-derived protein may be carried out using any known method without limitation, for example, protease treatment, acid treatment, or alkali treatment. The bitter melon peptide may also be a commercial product.

Soy peptide is a peptide with a low molecular weight obtained by hydrolysis of a soybean-derived protein. The hydrolysis of the soybean-derived protein may be carried out using any known method without limitation, for example, protease treatment, acid treatment, or alkali treatment. The soy peptide may also be a commercial product.

The average molecular weight of the walnut peptide, bitter melon peptide, and soy peptide used in the present invention is, for example, about 5000 or less, preferably about 150 to 3000, and more preferably about 150 to 2000, although not limited thereto. The molecular weight distribution of the walnut peptide, bitter melon peptide, and soy peptide is such that the ratio of peptides with molecular weights of 2000 or less is about 45% or more, preferably about 50 to 100%, and more preferably about 60 to 100%. When this ratio of peptides with molecular weights of 2000 or less is contained, the gardenia blue pigment can be further improved in brightness and further reduced in redness. As used herein, the average molecular weight of the peptide is the weight average molecular weight calculated by gel filtration chromatography using HPLC, using peptides of known molecular weights as standards. The ratio of peptides with molecular weights of 2000 or less is the ratio of the peak area of peptides with molecular weights of 2000 or less to the total peak area.

Genipin

Genipin is an aglycone of geniposide (iridoid glycoside) contained in the fruit of *Gardenia jasminoides* Ellis of Rubiaceae. Genipin can be obtained by the action of a β-glucosidase on geniposide obtained by subjecting the fruit of *Gardenia jasminoides* Ellis of Rubiaceae to an extraction treatment.

The fruit of *Gardenia jasminoides* Ellis of Rubiaceae used for the extraction of geniposide may be an undried, dried, or frozen product. For higher extraction efficiency, the fruit of *Gardenia jasminoides* Ellis of Rubiaceae may be shredded or pulverized.

Examples of extraction solvents used for the extraction of geniposide include water, organic solvents, and mixed solvents thereof. Preferred organic solvents are hydrophilic organic solvents, for example, monohydric alcohols with 1 to 5 carbon atoms (e.g., ethanol, methanol, propanol, and isopropanol), polyhydric alcohols with 2 to 5 carbon atoms (e.g., glycerin, isopropylene glycol, propylene glycol, and 1,3-butylene glycol), esters (e.g., methyl acetate), and ketones (e.g., acetone). From the viewpoint of safety and active-ingredient extraction efficiency, preferred among these extraction solvents are water, lower monohydric alcohols, and mixed solvents thereof; more preferred are water, ethanol, and hydrous ethanol (mixed solvent of water and ethanol); and even more preferred is hydrous ethanol. When a mixed solvent of a lower monohydric alcohol and water is used as the solvent, the mixture ratio between the monohydric lower alcohol and water may be such that, for example, the concentration of the lower monohydric alcohol is about 1 to 99% by mass, preferably about 40 to 90% by mass, and more preferably about 50 to 80% by mass, although not limited thereto.

The extraction method may be any common solvent extraction method without limitation, for example, a method in which the crude drug is immersed in the extraction solvent by cold extraction, hot extraction, or the like, and optionally stirred; and a percolation method.

Geniposide can be recovered by optionally subjecting the extract obtained by the extraction treatment to filtration, centrifugation, or the like to remove solids. The recovered geniposide may be optionally subjected to a purification treatment, such as an adsorption treatment or gel filtration, to increase the purity.

The β-glucosidase used to produce genipin from geniposide may be any enzyme having β-glucosidase activity, for example, a β-glucosidase from *Aspergillus niger, Trichoderma reesei, Trichoderma viride*, or almonds. The enzyme having β-glucosidase activity may be a commercial product. Examples of commercial enzymes having β-glucosidase activity include Sumizyme C6000, Sumizyme AC, Sumizyme C, Sumizyme X, Sumizyme BGT, Sumizyme BGA (trade name; SHINNIHON CHEMICALS CORPORATION), Cellulosin AC40, Cellulosin T3, Cellulosin AL (trade name; HBI ENZYMES INC.), Onozuka 3S, Y-NC (trade name; YAKULT PHARMACEUTICAL INDUSTRY CO., LTD.), Cellulase A "Amano" 3, and Cellulase T "Amano" 4 (trade name; AMANO ENZYME INC.).

To produce genipin by the action of a β-glucosidase on geniposide, the β-glucosidase and geniposide may coexist under conditions that allow the β-glucosidase to act. The amount of the β-glucosidase to be used may be set appropriately according to conditions such as geniposide concentration, reaction temperature, and reaction time.

While the temperature condition for allowing the β-glucosidase to act may be set appropriately in the temperature range where the β-glucosidase acts, it is, for example, about 30 to 60° C., and preferably about 40 to 50° C.

While the pH condition for allowing the β-glucosidase to act may be set appropriately in the pH range where the β-glucosidase acts, it is, for example, about pH 3.5 to 6.0, and preferably about pH 4.3 to 4.8.

Examples of reaction solvents for allowing the β-glucosidase to act include water; and buffer solutions, such as a phosphate buffer solution, a citrate buffer solution, a Tris buffer solution, a tartrate buffer solution, and a borate buffer solution.

While the time for the β-glucosidase to act may be set appropriately according to the amounts of the β-glucosidase and the geniposide used, the temperature condition, and the like, it is, for example, about 3 to 30 hours, and preferably about 5 to 24 hours.

The reaction solution containing genipin produced by the action of the β-glucosidase on geniposide may be used as is as a genipin-containing solution in the first step, or may be optionally subjected to a purification treatment, a concentration treatment, a drying treatment, or the like to give a concentrate or a dried product, and used in the first step.

Reaction

In the first step, the specific peptide and genipin are reacted while they coexist in a solvent without the supply of a gas containing oxygen.

The concentration of the specific peptide and the concentration of genipin at the beginning of the reaction are, for example, as follows: the concentration of the specific peptide is about 1 to 50% by mass, preferably about 5 to 30% by mass, and more preferably about 10 to 20% by mass, while the concentration of genipin is about 0.1 to 50% by mass, preferably about 1 to 20% by mass, and more preferably about 2.5 to 10% by mass.

The proportion of the specific peptide to genipin at the beginning of the reaction is, for example, about 20 to 1000 parts by mass, preferably about 100 to 600 parts by mass, more preferably about 200 to 300 parts by mass, of the specific peptide, per 100 parts by mass of genipin.

The pH at which the specific peptide is reacted with genipin is, for example, about 5 to 10, preferably about 6 to 9, and more preferably about 7 to 8. During the reaction, the pH may be adjusted to remain constant in these pH ranges.

Examples of the solvent for reacting the specific peptide with genipin include water; and buffer solutions, such as a phosphate buffer solution, a citrate buffer solution, a Tris buffer solution, a tartarate buffer solution, and a borate buffer solution.

In the first step, the reaction of the specific peptide and genipin while they coexist in a solvent may be carried out using, for example, a method in which genipin is added to a solution in which the specific peptide is dissolved; or a method in which the specific peptide is added to a solution in which genipin is dissolved. When the reaction solution containing genipin produced by the action of the β-glucosidase (genipin-containing solution) is used, the specific peptide may be added to the reaction solution.

In the first step, the specific peptide and genipin are reacted while they coexist in a solvent, without supplying a gas containing oxygen. The reaction of the specific peptide and genipin without supplying a gas containing oxygen may be carried out using, for example, a method in which, in an air atmosphere, they are stirred sufficiently gently to prevent the incorporation of air, or they are left standing without stirring (hereinafter, "the first method"); a method in which they are stirred or left standing in the atmosphere of an inert gas, such as nitrogen gas or argon gas; or a method in which an inert gas, such as nitrogen gas or argon gas, is supplied into the solution. Preferred among these methods is the first method, which is simple because it does not require the preparation of an inert gas or special equipment.

The temperature during the reaction in the first step is, for example, about 5 to 50° C. preferably about 10 to 45° C., and more preferably about 20 to 40° C.

The reaction time in the first step is, for example, about 1 hour or more, preferably about 3 to 24 hours, and more preferably about 5 to 20 hours.

[Second Step]

In the second step, the reaction solution obtained in the first step is treated with the supply of a gas containing oxygen. The reaction solution obtained in the first step may be used as is in the second step; alternatively, it may be optionally adjusted to a pH of about 5 to 10, preferably about 6 to 9, more preferably about 7 to 8, and then subjected to the second step. During the reaction, the pH may be adjusted to remain constant in these pH ranges.

The gas containing oxygen used in the second step may be oxygen gas itself, or may be, for example, air or a like gas that contains a gas component other than oxygen. From the viewpoint of a reduction in production costs and the like, air is preferred as the gas containing oxygen.

The gas containing oxygen is supplied to the reaction solution obtained in the first step, using, for example, a method in which the gas containing oxygen is directly introduced into the reaction solution, and optionally stirred; or a method in which the reaction solution is stirred in the atmosphere of the gas containing oxygen so that the gas containing oxygen enters the reaction solution.

The supply amount of the gas containing oxygen may be similar to the aerobic conditions (conditions for color development) as employed in the manufacturing of conventional gardenia blue pigments, and may be set appropriately according to the size of the equipment for carrying out the second step, whether stirring is carried out or not during the supply of the gas containing oxygen, the stirring speed, and the like. For example, the supply amount of oxygen is 0.01 to 5.0 vvm, preferably 0.05 to 2.5 vvm, and more preferably 0.1 to 1.0 vvm. As used herein, the unit "vvm" for the supply amount of the gas containing oxygen refers to the amount of the gas supplied in 1 minute per liter of the reaction solution obtained in the first step. As used herein, the exemplary amounts of the gas containing oxygen are expressed as the speed of supply of air itself. Specifically, for example, when pure oxygen gas is used as the gas containing oxygen, because air contains about 20% by volume of oxygen, the oxygen gas may be supplied in an amount of 20% by volume of the above-described supply amount.

The temperature of the reaction solution at which the gas containing oxygen is supplied is, for example, about 5 to 50° C., preferably about 10 to 45° C., and more preferably about 20 to 40° C. The temperature during the second step may be constant, or may vary in these ranges during the reaction.

In the second step, the gas containing oxygen may be supplied until the gardenia blue pigment having acidic heating resistance is produced, and the time for supplying the gas containing oxygen may be set appropriately according to the speed of supply of the gas containing oxygen, the reaction temperature, and the like. When, for example, walnut peptide and/or bitter melon peptide is used, the gas containing oxygen may be supplied until the increase in the color value of the reaction solution levels off. Specifically, the time for supplying the gas containing oxygen is 20 to 120 hours, preferably 30 to 100 hours, and more preferably 40 to 80 hours. When, for example, soy peptide is used, the gardenia blue pigment having acidic heating resistance may not be produced at the time when the increase in the color value of the reaction solution levels off; thus, it is desirable to further continue supplying the gas containing oxygen after the increase in the color value of the reaction solution levels off. Specifically, the time for supplying the gas containing oxygen is 40 to 140 hours, preferably 50 to 130 hours, and more preferably 60 to 120 hours.

By thus carrying out the second step, the above-described gardenia blue pigment having acidic heating resistance is produced. The reaction solution obtained in the second step may be used as is, as the gardenia blue pigment solution; alternatively, it may be optionally subjected to a purification treatment, a concentration treatment, a drying treatment, or the like to give a concentrate or a dried product of the gardenia blue pigment.

EXAMPLES

The present invention will be hereinafter described in detail based on examples and the like, although the present invention is not limited thereto.

Text Example 1

1. Production of Gardenia Blue Pigment (Examples 1-1 to 1-3)
(1) Preparation of Genipin First, a geniposide solution (color value $E^{10\%}_{1\ cm}$: 1335.48; measurement wavelength: 238 nm; geniposide content: about 45% by mass) extracted and purified from the fruit of Gardenia jasminoides Ellis of Rubiaceae was prepared. 4.17 g of a β-glucosidase activity-containing cellulase (SUMIZYME C, 1500 U/g; SHINNIHON CHEMICALS CORPORATION) was dissolved in 41.67 g of purified water, and 41.67 g of the geniposide solution (color value $E^{10\%}_{1\ cm}$ at the beginning of the reaction: 245; measurement wavelength: 238 nm; geniposide concentration: about 0.2 mol/L) was added thereto. Then, after the pH of the solution was adjusted to 4.5, the enzymatic reaction was carried out at 50° C. for 18 hours to obtain a genipin-containing solution (solution after the reaction).

(2) Reaction Under Conditions without Supply of Oxygen Gas 1.65 g of sodium dihydrogen phosphate dihydrate, 1.28 g of trisodium phosphate (anhydrous), and 22.83 g of walnut peptide (Walnut peptide powder; WUHAN TALLYHO BIOLOGICAL PRODUCT CO., LTD.), bitter melon peptide (Bitter melon peptide powder; WUHAN TALLYHO BIOLOGICAL PRODUCT CO., LTD.), or soy peptide (Hinute-AM; FUJI OIL CO., LTD.) were added to and dissolved in 75 g of water. The obtained solution was mixed into the (entire amount of) genipin-containing solution obtained above, and the pH of the mixture was adjusted to 7.5. The obtained solution was transferred into a 300-mL beaker, which was sealed, and reacted for 18 hours without aeration, under a stirring (magnetic stirrer) condition of 100 rpm at 35° C.

(3) Reaction Under Conditions with Supply of Oxygen Gas

After the reaction solution after the reaction under conditions without the supply of oxygen gas was adjusted to pH 7.0 (Examples 1-1, 1-3, and 1-4) or pH 5.0 (Example 1-2), it was transferred into a 500-mL flask, and, with the mouth of the flask open to the air atmosphere, the reaction was carried out for 120 hours (Examples 1-2 and 1-4) or 48 hours (Examples 1-1 and 1-3), under a stirring condition of 150 rpm at 35° C. In this manner, a gardenia blue pigment-containing solution (solution after the reaction) was obtained.

2. Measurement of Acidic Heating Resistance of Gardenia Blue Pigment

The obtained gardenia blue pigment-containing solution was diluted with 0.1 M citrate buffer at pH 2.5 to prepare solution A (color value $E^{10\%}_{1\ cm}$: 0.1). Separately, the obtained gardenia blue pigment-containing solution was diluted with 0.1 M citrate buffer at pH 6.0 to prepare solution B (color value $E^{10\%}_{1\ cm}$: 0.1). After solutions A and B were left standing at 5° C. for about 18 hours, solution A was heat-treated at 90° C. for 15 minutes. Solution B was not heat-treated. Solutions A and B were centrifuged at 3.000 rpm for 10 minutes in a centrifuge, and the absorbance of the supernatant at the maximum absorption wavelength around 600 nm was measured. The ratio of the absorbance of solution A to the absorbance of solution B taken as 100% was determined as the residual ratio after the heat treatment at 90° C. for 15 minutes under a pH condition of 2.5.

Moreover, the color tones of solution A after the heat-treatment and non-heat treated solution B (after being left standing at 5° C. for about 18 hours) were measured using a spectrophotometer (CM-5; KONICA MINOLTA JAPAN, INC.). The measurement conditions were set as follows: total transmission measurement, a D65 light source, a field-of-view of 10°, a measurement diameter of 20 mm, and an irradiation diameter of 26 mm.

The results are shown in Table 1. The results showed that the gardenia blue pigments each obtained by reacting walnut peptide, bitter melon peptide, or soy peptide with genipin under conditions without the supply of oxygen gas, and then reacting the reaction solution with the supply of oxygen gas, even after they are heated under a pH condition of 2.5 (color value $E^{10\%}_{1\ cm}$: 0.1), have an L* value of 64 or more, an a* value of −14 or less, and a b* value of −31 or more, and moreover, have a $\Delta E^*_{ab}$ of 3.5 or less in comparison with the non-heated solution under a pH condition of 6.0 (color value $E^{10\%}_{1\ cm}$: 0.1), and thus, have excellent acidic heating resistance.

TABLE 1

| | Peptide added | pH at the beginning of supply of oxygen gas | | Measurement results | | | | | |
|---|---|---|---|---|---|---|---|---|---|
| | | | | Residual ratio (%) | L* value | a* value | b* value | c* value | ΔE*$_{ab}$ value° |
| Example 1-1 | Walnut peptide | 7.0 | Solution A after heat treatment (pH 2.5) | 96.2 | 65.17 | −18.32 | −28.73 | 34.07 | 2.36 |
| | | | Non-heat treated solution B (pH 6.0) | — | 65.96 | −19.56 | −28.14 | 34.27 | — |
| Example 1-2 | Walnut peptide | 5.0 | Solution A after heat treatment (pH 2.5) | 96.89 | 67.12 | −18.36 | 26.24 | 32.03 | 0.58 |
| | | | Non-heat treated solution B (pH 6.0) | — | 66.92 | −18.7 | 26.68 | 32.58 | — |
| Example 1-3 | Bitter melon peptide | 7.0 | Solution A after heat treatment (pH 2.5) | 95.73 | 64.39 | −14.69 | −30.44 | 33.80 | 3.43 |
| | | | Non-heat treated solution B (pH 6.0) | — | 65.61 | −16.65 | −27.9 | 32.49 | — |
| Example 1-4 | Soy peptide | 7.0 | Solution A after heat treatment (pH 2.5) | 98.83 | 64.98 | −19.93 | −28.74 | 34.97 | 1.73 |
| | | | Non-heat treated solution B (pH 6.0) | — | 65.37 | −23.61 | −28.81 | 36.01 | — |

°: The ΔE*$_{ab}$ value represents the value of the color difference relative to non-heat treated solution B as the reference.

Test Example 2

1. Production of Gardenia Blue Pigment (Comparative Examples 2-1 to 2-5)

Gardenia blue pigments were produced under the same conditions as in Example 1-1, except that the peptides or amino acids as shown in Table 2 were used instead of the walnut peptide.

2. Measurement of Acidic Heating Resistance of Gardenia Blue Pigment

Acidic heating resistance was measured under the same conditions as in Test Example 1. The results are shown in Table 2. The results confirmed that when a peptide other than walnut peptide, bitter melon peptide, and soy peptide is reacted with genipin without the supply of air, and then the reaction solution is reacted with the supply of air, the obtained gardenia blue pigment fails to have acidic heating resistance.

TABLE 2

| | Peptide added | | Measurement results | | | | |
|---|---|---|---|---|---|---|---|
| | | | L* value | a* value | b* value | c* value | ΔE*$_{ab}$ value° |
| Comparative Example 2-1 | Silk peptide (Tango silk powder 100%; TANGO YOU SILK, LTD.) | Solution A after heat treatment (pH 2.5) | 64.38 | −1.27 | −25.04 | 25.07 | 5.72 |
| | | Non-heat treated solution B (pH 6.0) | 63.26 | −3.65 | −30.11 | 30.33 | — |
| Comparative Example 2-2 | Pea peptide (Pea peptide powder; WUHAN TALLYHO BIOLOGICAL PRODUCT CO., LTD.) | Solution A after heat treatment (pH 2.5) | 65.45 | −37.29 | −29.50 | 34.19 | 6.17 |
| | | Non-heat treated solution B (pH 6.0) | 68.96 | −37.31 | −24.42 | 29.93 | — |
| Comparative Example 2-3 | Sea cucumber peptide (Sea cucumber oligopeptide; DALIAN BLUESCITECH TECHNOLOGY RESEARCH AND DEVELOPMENT CO., LTD.) | Solution A after heat treatment (pH 2.5) | 66.53 | −35.33 | −23.03 | 27.67 | 6.38 |
| | | Non-heat treated solution B (pH 6.0) | 66.75 | −39.75 | −27.62 | 33.95 | — |

TABLE 2-continued

| | Peptide added | | L* value | a* value | b* value | c* value | ΔE*$_{ab}$ value° |
|---|---|---|---|---|---|---|---|
| | | | Measurement results | | | | |
| Comparative Example 2-4 | Fish collagen peptide (Fish collagen tripeptide; WUHAN TALLYHO BIOLOGICAL PRODUCT CO., LTD.) | Solution A after heat treatment (pH 2.5) | 58.32 | −34.24 | −31.41 | 34.48 | 8.04 |
| | | Non-heat treated solution B (pH 6.0) | 62.1 | −36.52 | −30.00 | 34.25 | — |
| Comparative Example 2-5 | Histidine | Solution A after heat treatment (pH 2.5) | 68.18 | −33.24 | −26.92 | 30.00 | 3.20 |
| | | Non-heat treated solution B (pH 6.0) | 69.67 | −15.19 | −27.23 | 31.18 | — |
| Comparative Example 2-6 | Glutamic acid | Solution A after heat treatment (pH 2.5) | 70.11 | −8.44 | −25.68 | 27.03 | 7.27 |
| | | Non-heat treated solution B (pH 6.0) | 67.25 | −33.12 | −30.45 | 33.15 | — |
| Comparative Example 2-7 | Aspartic acid | Solution A after heat treatment (pH 2.5) | 72.61 | −9.47 | −23.52 | 25.35 | 8.85 |
| | | Non-heat treated solution B (pH 6.0) | 69.37 | −15.29 | −29.36 | 33.10 | — |

°: The ΔE*$_{ab}$ value represents the value of the color difference relative to non-heat treated solution B as the reference.

The invention claimed is:

1. A gardenia blue pigment, wherein, when the gardenia blue pigment is subjected to operations as set forth in (1) to (3) below, a color difference ΔE'$_{ab}$ between solution A heat-treated at 90° C. for 15 minutes and solution B not heat-treated is 3.5 or less, and solution A heat treated at 90° C. for 15 minutes has an L* value of 64 or more, an a* value of −14 or less, and a b* value of −31 or more:

wherein the operations comprise:

(1) a preparation step, wherein
the gardenia blue pigment is diluted with 0.1 M citrate buffer at pH 2.5 to prepare solution A with a color value $E^{10\%}_{1\,cm}$ of 0.1; separately, the gardenia blue pigment is diluted with 0.1 M citrate buffer at pH 6.0 to prepare solution B with a color value $E^{10\%}_{1\,cm}$ of 0.1;

(2) a heat-treatment of the solutions step, wherein
solution A is heat-treated at 90° C. for 15 minutes; solution B is not heat-treated;

(3) a measurement of color tone step, wherein
for solution A heat treated at 90° C. for 15 minutes and solution B not heat-treated, the L* value, the a* value, and the b* value in the Lab color space are measured.

2. A food or beverage product colored with the gardenia blue pigment according to claim 1.

3. The food or beverage product according to claim 2, which is an acidic food or beverage product.

* * * * *